(12) United States Patent
Huang et al.

(10) Patent No.: US 11,898,576 B2
(45) Date of Patent: Feb. 13, 2024

(54) CENTRIFUGAL FAN AND AIR CONDITIONING APPARATUS

(71) Applicants: Huawei Digital Power Technologies Co., Ltd., Shenzhen (CN); Fans-tech Electric Co., Ltd., Foshan (CN)

(72) Inventors: Huanwen Huang, Dongguan (CN); Hsienchou Lin, Shenzhen (CN); Jingyi Luo, Foshan (CN)

(73) Assignees: Huawei Digital Power Technologies Co., Ltd., Shenzhen (CN); Fans-tech Electric Co., Ltd., Foshan (CN)

( * ) Notice: Subject to any disclaimer, the term of this patent is extended or adjusted under 35 U.S.C. 154(b) by 78 days.

(21) Appl. No.: 17/548,228

(22) Filed: Dec. 10, 2021

(65) Prior Publication Data

US 2022/0099106 A1    Mar. 31, 2022

Related U.S. Application Data

(63) Continuation of application No. PCT/CN2020/109648, filed on Aug. 17, 2020.

(30) Foreign Application Priority Data

Feb. 29, 2020    (CN) .......................... 202020229013.7

(51) Int. Cl.
*F04D 29/44* (2006.01)
*F04D 17/16* (2006.01)
(Continued)

(52) U.S. Cl.
CPC ........... *F04D 29/441* (2013.01); *F04D 17/16* (2013.01); *F04D 25/06* (2013.01); *F04D 29/624* (2013.01)

(58) Field of Classification Search
CPC ...... F04D 17/16; F04D 25/0613; F04D 25/08; F04D 29/263; F04D 29/441; F04D 29/624
See application file for complete search history.

(56) References Cited

U.S. PATENT DOCUMENTS

| | | | |
|---|---|---|---|
| 2005/0163614 A1* | 7/2005 | Chapman | F04D 29/30 415/206 |
| 2006/0177324 A1* | 8/2006 | O'Toole | F04D 29/547 417/423.1 |
| 2010/0129224 A1* | 5/2010 | Shibata | F04D 29/284 416/182 |
| 2013/0028720 A1* | 1/2013 | Fujimoto | F04D 17/16 415/203 |

(Continued)

FOREIGN PATENT DOCUMENTS

| CN | 202789608 U | 3/2013 |
|---|---|---|
| CN | 203161647 U | 8/2013 |

(Continued)

OTHER PUBLICATIONS

CN-209908804-U (Xu, Hai-ming, Jan. 7, 2020), English Translation (Year: 2023).*

(Continued)

*Primary Examiner* — Justin D Seabe
*Assistant Examiner* — Aye S Htay
(74) *Attorney, Agent, or Firm* — Leydig. Voit & Mayer, Ltd.

(57) ABSTRACT

A centrifugal fan and an air conditioning apparatus are provided. The centrifugal fan includes a top plate, a baseplate, a motor, a flow guiding cover, and a plurality of blades. A motor mounting hole is disposed at a central position of the baseplate, and the motor has a motor housing. The motor housing is mounted on the motor mounting hole and is fastened to the baseplate, and the motor at least partially extends between the baseplate and top plate. The blades are fastened between the top plate and the baseplate, and the plurality of blades are disposed around the motor. The flow guiding cover is sheathed on an outer peripheral side of the motor housing, and is detachably mounted on the baseplate.

15 Claims, 4 Drawing Sheets

(51) Int. Cl.
*F04D 25/06* (2006.01)
*F04D 29/62* (2006.01)

(56) References Cited

U.S. PATENT DOCUMENTS

| | | | | |
|---|---|---|---|---|
| 2013/0028759 | A1* | 1/2013 | Berroth | F04D 25/0613 |
| | | | | 417/371 |
| 2014/0271172 | A1* | 9/2014 | Van Houten | F04D 29/681 |
| | | | | 415/211.1 |
| 2015/0118037 | A1* | 4/2015 | Otsuka | F04D 29/30 |
| | | | | 415/206 |
| 2015/0316073 | A1 | 11/2015 | Lörcher et al. | |
| 2016/0025107 | A1 | 1/2016 | Pettitt | |

FOREIGN PATENT DOCUMENTS

| | | |
|---|---|---|
| CN | 203175982 U | 9/2013 |
| CN | 102301144 B | 7/2014 |
| CN | 203756593 U | 8/2014 |
| CN | 204663976 U | 9/2015 |
| CN | 105090106 A | 11/2015 |
| CN | 105090107 A | 11/2015 |
| CN | 105317743 A | 2/2016 |
| CN | 109854531 A | 6/2019 |
| CN | 209041172 U | 6/2019 |
| CN | 209908803 U * | 1/2020 |
| CN | 209908803 U | 1/2020 |
| CN | 209908804 U * | 1/2020 |
| CN | 209908804 U | 1/2020 |
| CN | 210068559 U | 2/2020 |
| JP | 2004204800 A | 7/2004 |

OTHER PUBLICATIONS

CN-209908803-U (Xu, Hai-ming, Jan. 7, 2020), English Translation (Year: 2023).*

* cited by examiner

CENTRIFUGAL FAN AND AIR CONDITIONING APPARATUS

CROSS-REFERENCE TO RELATED APPLICATIONS

This application claims is a continuation of International Application No. PCT/CN2020/109648, filed on Aug. 17, 2020, which claims priority to Chinese Patent Application No. 202020229013.7, filed on Feb. 29, 2020. The disclosures of the aforementioned applications are hereby incorporated by reference in their entireties.

TECHNICAL FIELD

Embodiments of this application relate to the field of electronic device technologies, and in particular, to a centrifugal fan and an air conditioning apparatus.

BACKGROUND

With the development of communications devices, a demand for high energy efficiency of air conditioning apparatuses in computer rooms is increasing day by day. A centrifugal fan is a core component of an air conditioning apparatus in a computer room. Efficiency of the centrifugal fan directly affects energy efficiency of the air conditioning apparatus. How to improve the efficiency of the centrifugal fan as well as cost-effectiveness of the centrifugal fan becomes a focus of the industry.

FIG. 1 is a schematic cross-sectional structural diagram of a centrifugal fan in the conventional technology. Specifically, the schematic cross-sectional structural diagram is a schematic diagram of a cross-sectional structure perpendicular to a baseplate and traversing a rotating shaft of a motor. As shown in FIG. 1, a centrifugal fan includes a top plate 1, a baseplate 2, blades 3, and a motor 4. The motor 4 is mounted on the baseplate 2, the blades 3 are fastened between the top plate 1 and the baseplate 2, and the blades 3 are disposed around the motor 4. In the conventional technology, the baseplate 2 may be prepared by using a metal material, for example, formed by stamping an aluminum plate. Affected by a processing process, the baseplate 2 made of the metal material is substantially planar. A right-angled groove 5 is formed between the baseplate 2 and a housing of the motor 4. After air enters the groove 5, impact is easily formed, causing impact loss. In addition, airflow impact causes inlet air turbulence of impellers, which is easy to form a vortex on a surface of the blade 3, causing vortex loss. Consequently, aerodynamic efficiency of the fan is reduced, and noise increases.

SUMMARY

This application provides a centrifugal fan and an air conditioning apparatus, to improve aerodynamic efficiency of the centrifugal fan and reduce noise generated by the centrifugal fan.

According to a first aspect, this application provides a centrifugal fan. The centrifugal fan includes a top plate, a baseplate, a motor, a flow guiding cover, and a plurality of blades. A motor mounting hole is disposed at a central position of the plurality of baseplates, and the motor has a motor housing. The motor housing is mounted on the motor mounting hole and is fastened to the baseplate, and the motor at least partially extends between the baseplate and top plate. The blades are fastened between the top plate and the baseplate, and the plurality of blades are disposed around the motor. The flow guiding cover is sheathed on an outer peripheral side of the motor housing, and is detachably mounted on the baseplate. In this solution, the flow guiding cover fills a groove formed between the motor housing and the baseplate, to avoid a problem of increased resistance caused when air flows through an area between the motor housing and the baseplate due to discontinuity of contours, thereby reducing impact loss. The flow guiding cover can further play a role in guiding airflow entering and leaving the centrifugal fan, so that the airflow evenly enters the centrifugal fan, thereby reducing vortex loss on the blades, reducing separation loss generated by a trailing edge, improving aerodynamic efficiency of the centrifugal fan, and reducing noise generated by the airflow.

When the flow guiding cover is specifically disposed, one end of the flow guiding cover close to the baseplate may be made to smoothly transition to the baseplate, to reduce wind resistance generated at a transition position between the flow guiding cover and the baseplate, thereby improving aerodynamic efficiency and reducing noise.

In addition, one end of the flow guiding cover away from the baseplate may be further made to smoothly transition to the outer peripheral side of the motor housing, to reduce wind resistance generated between the flow guiding cover and the motor housing, thereby improving aerodynamic efficiency and reducing noise.

In a specific technical solution of this application, a contour of an outer surface of the flow guiding cover is not specifically limited, and may be selected based on a requirement. For example, a straight line shape or an arc shape may be selected. However, when a contour line of the outer surface of the flow guiding cover along the end close to the baseplate to the end away from the baseplate is a wavy line or a sinusoidal waveform, the contour line being a wavy line or a sinusoidal waveform is more conducive to smooth transition between the flow guiding cover and the baseplate, and smooth transition between the flow guiding cover and the motor housing.

When the motor housing is specifically disposed, a top of the motor housing may have a rounded corner. In this solution, the end of the flow guiding cover away from the baseplate is flush with an edge of the rounded corner of the motor housing toward the baseplate. In other words, a rounded corner area of the motor housing is exposed from an edge of the flow guiding cover. This is convenient for the motor to perform heat dissipation, thereby improving heat dissipation efficiency of the motor. In addition, in this solution, the top of the motor housing has the rounded corner, so that wind resistance is low.

In the technical solution of this application, the baseplate may further include a mounting boss, the motor is mounted on the baseplate through the motor mounting hole on the mounting boss, and the flow guiding cover may be disposed on the mounting boss. In this solution, the mounting boss may be made to have a transition surface, to reduce a height of the flow guiding cover, thereby improving strength of the flow guiding cover.

According to the technical solution of this application, the baseplate, the top plate, and the blades may be made of metal. In other words, the centrifugal fan includes a metal baseplate, a metal top plate, and metal blades. The flow guiding cover is made of plastic. In this solution, a main structure of the centrifugal fan is a metal structure, which has high strength. Especially in a scenario of high static pressure, the centrifugal fan can meet a strength requirement. The plastic flow guiding cover can improve aerodynamic efficiency, reduce noise, and further reduce costs.

When the flow guiding cover is specifically disposed, the flow guiding cover may include at least two sub flow guiding covers. The at least two sub flow guiding covers are sequentially stacked along a direction away from the baseplate, and a contour of the flow guiding cover formed by the stacked sub flow guiding covers has a flow guiding effect. In this solution, a plurality of sub flow guiding covers with relatively small volumes may be prepared, to improve strength of the flow guiding cover and facilitate manufacturing and transportation.

Blade edges of the centrifugal fan include an air inlet edge close to an air inlet side and an air outlet edge close to an air outlet side. There is further a suction surface with a concave surface and a pressure surface opposite to the suction surface. In the technical solution of this application, air inlet edges and air outlet edges of the blades each have a one-sided rounded corner facing a suction surface. In this solution, a manufacturing process of the blades may be simplified, and wind resistance of the blades may be reduced.

A radius R1 of the one-sided rounded corner and a thickness D of the blade satisfy R1=αD, and 0.5≤α≤1.5. This helps reduce wind resistance of the blade and improve efficiency of the centrifugal fan. Specifically, when the radius R1 of the one-sided rounded corner is equal to the thickness D of the blade, the wind resistance of the blade is lowest, and the efficiency of the centrifugal fan is highest.

According to a second aspect, this application further provides an air conditioning apparatus. The air conditioning apparatus includes the centrifugal fan in any one of the foregoing technical solutions. When the centrifugal fan of the air conditioning apparatus meets a strength requirement, the centrifugal fan of the air conditioning apparatus may have relatively high pneumatic efficiency, and may further have relatively low noise.

DESCRIPTION OF REFERENCE NUMERALS

Figure 1:
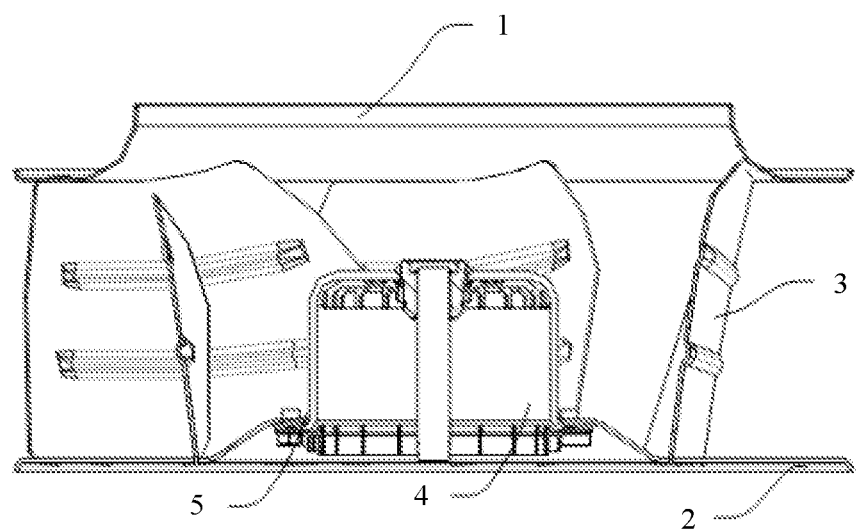
FIG. 1 is a schematic cross-sectional structural diagram of a centrifugal fan in the conventional technology.

1—Top plate; 2—Baseplate;
21—Motor mounting hole; 22—Mounting boss;
3—Blade; 31—Air inlet edge;
32—Air outlet edge; 33—Suction surface;
34—One-sided rounded corner; 4—Motor;
41—Motor housing; 411—Rounded corner;
42—Mounting steel ring; 5—Groove;
6—Flow guiding cover; and 61—Screw hole.

DESCRIPTION OF EMBODIMENTS

To make objectives, technical solutions, and advantages of this application clearer, the following further describes this application in detail with reference to accompanying drawings.

To facilitate understanding of a centrifugal fan and an air conditioning apparatus provided in embodiments of this application, the following first describes application scenarios of the centrifugal fan and the air conditioning apparatus.

The air conditioning apparatus provided in the embodiments of this application includes a centrifugal fan. As an air supply component of the air conditioning apparatus, the centrifugal fan makes air flow for heat transfer. Generally, a motor drives an impeller to rotate, so that air flows to form wind. Specifically, the centrifugal fan includes a baseplate, a top plate, and a plurality of blades disposed between the baseplate and the top plate. A motor is further disposed on the baseplate to drive the blades to rotate. In the conventional technology, the baseplate may be prepared by using metal, and the baseplate made of the metal is substantially planar. Therefore, a motor housing of the motor is mounted on the baseplate, and the motor housing extends between the baseplate and the top plate. In this case, a groove area is formed between an outer surface of the motor housing and the baseplate, and the groove area causes impact loss and noise. To resolve the foregoing problem, this application provides a new type of centrifugal fan and an air conditioning apparatus. The centrifugal fan has relatively high energy efficiency and low noise.

For clear understanding of the technical solutions in this application, the following describes in detail a chassis provided in this application with reference to specific embodiments and the accompanying drawings.

Terms used in the following embodiments are merely for the purpose of describing specific embodiments, but are not intended to limit this application. As used in the specification and appended claims of this application, the singular expressions "a", "an", "the above", "the" and "this" are intended to also include expressions such as "one or more", unless the contrary is clearly indicated in its context. It should be further understood that in the following embodiments of this application, "at least one" and "one or more" refer to one, two, or more.

Reference to "an embodiment", "some embodiments", or the like described in this specification means that one or more embodiments of this application include specific features, structures, or characteristics described in combination with the embodiment. Therefore, statements such as "in an embodiment", "in some embodiments", "in some other embodiments", and "in other embodiments" that appear at different locations in this specification do not necessarily refer to a same embodiment, but means "one or more, but not all embodiments" unless otherwise specifically emphasized. Terms "include", "comprise", "have", and their variants all mean "including but not limited to", unless otherwise specifically emphasized.

Figure 2:
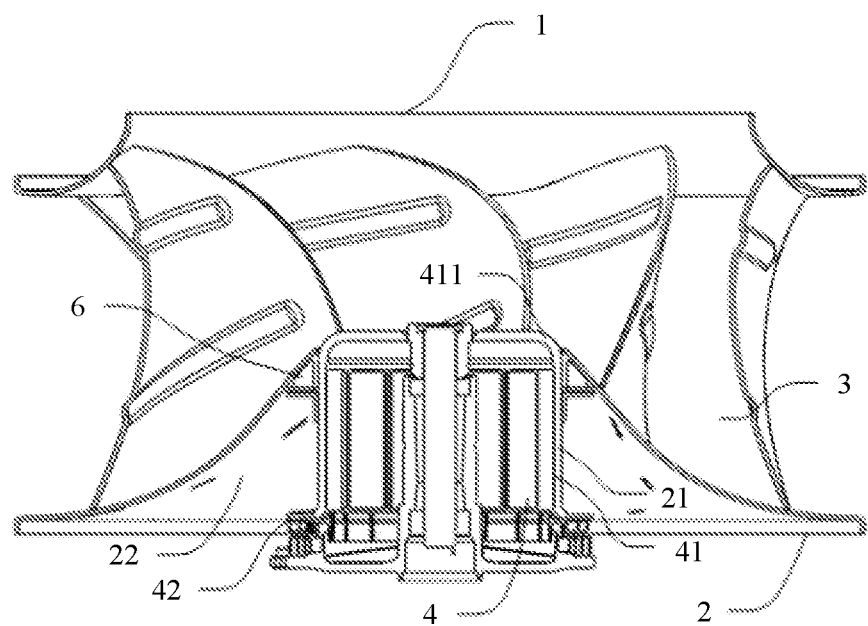
FIG. 2 is a schematic cross-sectional structural diagram of a centrifugal fan according to an embodiment of this application.
Figure 3:
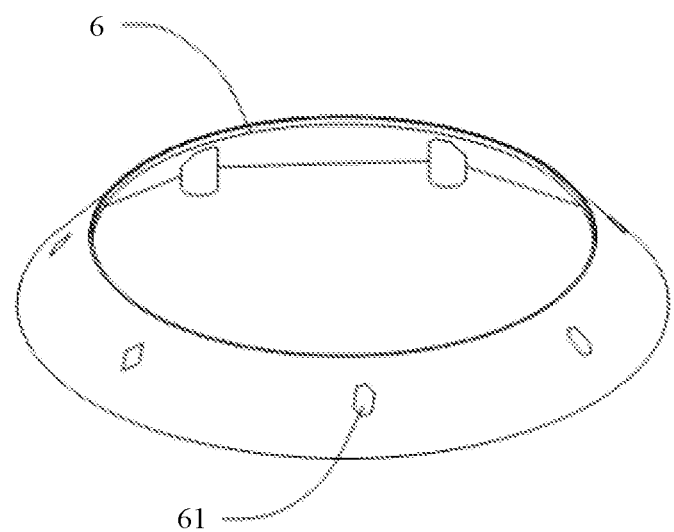
FIG. 3 is a schematic structural diagram of a flow guiding cover according to an embodiment of this application.

FIG. 2 is a schematic cross-sectional structural diagram of a centrifugal fan according to an embodiment of this application. Specifically, the schematic cross-sectional structural diagram is a schematic diagram of a cross-sectional structure perpendicular to a baseplate and traversing a rotating shaft of a motor. FIG. 3 is a schematic structural diagram of a flow guiding cover according to an embodiment of this application. Referring to FIG. 2, the centrifugal fan provided in this embodiment of this application includes a top plate 1, a baseplate 2, a motor 4, a flow guiding cover 6, and a plurality of blades 3. The baseplate 2 has a motor mounting hole 21, and the motor 4 has a motor housing 41. The motor housing 41 extends into the motor mounting hole 21 and is fastened to the baseplate 2, and at least a part of a structure of the motor housing 41 extends between the baseplate 2 and the top plate 1. The motor 4 is configured to provide driving force for rotation of the blades 3. The motor housing 41 extends between the baseplate 2 and the top plate 1 along an axial direction. Therefore, the axial direction of the motor housing 41 is substantially perpendicular to the baseplate 2. The plurality of blades 3 are fastened between the baseplate 2 and the top plate 1, and are arranged in an annular manner around the motor mounting hole 21. The flow guiding cover 6 is detachably mounted on the baseplate 2, and the flow guiding cover 6 is sheathed on an outer peripheral side of the motor housing 41, to guide flow between the outer peripheral side of the motor housing 41 and the baseplate 2. In this solution, the flow guiding cover 6 is located between the motor housing 41 and the baseplate 2, and fills a groove formed between the motor housing 41 and the baseplate 2, to avoid a problem of increased resistance caused when air flows through an area between the motor housing 41 and the baseplate 2 due to discontinuity of contours, thereby reducing impact loss. After forming transition between the baseplate 2 and the motor 4, the flow guiding cover 6 can play a role in guiding airflow entering and leaving the centrifugal fan, so that the airflow evenly enters the centrifugal fan, thereby reducing vortex loss on the blades 3, reducing separation loss generated by a trailing edge, improving aerodynamic efficiency of the centrifugal fan, and reducing inlet air turbulence, narrowband noise generated by a leading edge of the blade 3, and wideband noise of a vortex in a flow passageway of the blade 3.

Further referring to FIG. 2, when the centrifugal fan is specifically prepared, the baseplate 2, the top plate 1, and the blades 3 may all be made of metal materials. Specifically, each structure may be prepared in a stamping manner, and then the blades 3 are fastened between the baseplate 2 and the top plate 1 in a welding manner. In this solution, a main structure of the centrifugal fan is a metal structure, which has high strength. Especially in a scenario of high static pressure, the centrifugal fan can meet a strength requirement. In this solution, a main body of the centrifugal fan made of a metal material may be combined with the flow guiding cover 6, so that the centrifugal fan cannot only meet the strength requirement, but also improve aerodynamic efficiency of the centrifugal fan and reduce noise of the centrifugal fan during running.

When the flow guiding cover 6 is specifically prepared, a material of the flow guiding cover 6 is not limited, and the material of the flow guiding cover 6 may be metal or plastic, such as acrylonitrile-butadiene-styrene copolymer (ABS), engineering plastic alloy (PC+ABS), polyamide 6 (PA6), polyhexamethylenediamine (PA66), glass fiber reinforced polybutylene terephthalate (PBT+glass fiber), glass fiber reinforced polycarbonate (PC+glass fiber), polyphosphate (PPE), or polypropylene (PP). When the flow guiding cover 6 is a plastic flow guiding cover 6, the flow guiding cover 6 may be prepared in a plastic molding manner. Compared with a solution in which an integrated structure of the baseplate 2 and the blades 3 is prepared in a plastic molding manner in an existing design, a volume of the flow guiding cover 6 in this application is relatively small. Therefore, costs of preparing the plastic flow guiding cover 6 in the plastic molding manner are relatively low, and the costs may be reduced by 9.3%. In addition, the inventor finds through experiments and analysis that, when the plastic flow guiding cover 6 is used in the centrifugal fan in this embodiment of this application, the aerodynamic efficiency of the centrifugal fan can be improved by 1% to 2.5%. In this case, power consumption of each centrifugal fan can be reduced by 68 W to 166 W. For a typical data center of communications devices, annual electricity costs saved are about CNY 600,000 to 1.45 million. The noise of the centrifugal fan can be reduced by 1 dB (A) to 1.5 dB (A), and overall competitiveness of the product is greatly improved. In addition, when the plastic molding manner is used to prepare the flow guiding cover 6, the flow guiding cover 6 can meet requirements of various working condition parameters and has better adaptability.

A shape and a size of the flow guiding cover 6 may be specifically designed based on a requirement. To improve a flow guiding effect of the flow guiding cover 6, one end of the flow guiding cover 6 may be made to smoothly transition to the baseplate 2, and a gap between the flow guiding cover 6 and the baseplate 2 is made to be less than 1.5 mm. One end of the flow guiding cover 6 away from the baseplate 2 smoothly transitions to an outer peripheral side of the motor housing 41, and a gap between the flow guiding cover 6 and the motor housing 41 is made to be less than 1.5 mm, so that an overall smooth transition structure is implemented between the motor housing 41 and the baseplate 2. In this solution, the flow guiding effect and a noise reduction effect of the flow guiding cover 6 can be improved.

A height of the flow guiding cover 6 is not limited, and may be any height within a range of 5 mm to 100 mm. In a specific embodiment, one end of the flow guiding cover 6 may be in contact with and fastened to the baseplate 2, and one end that is away from the baseplate 2 is flush with a top of the motor housing 41. In this solution, the flow guiding effect of the flow guiding cover 6 is improved. In addition, the height of the flow guiding cover 6 is relatively high, facilitating relatively smooth transition between the motor housing 41 and the baseplate 2.

Referring to FIG. 2, the top of the motor housing 41 has a rounded corner 411. That is, one side of the motor housing 41 away from the baseplate 2 has a rounded corner contour. One end of the flow guiding cover 6 away from the baseplate 2 is flush with an edge of the rounded corner 411 of the motor housing 41 toward the baseplate 2. In this embodiment, a highest point of the flow guiding cover 6 is substantially flush with a lowest point of the edge of the rounded corner 411 of the motor housing 41, so that the flow guiding cover 6 does not completely cover a top of the motor 4, and the motor 4 is exposed from the flow guiding cover 6 to a height of a radius of the rounded corner 411, thereby facilitating heat dissipation of the motor 4. The motor housing 41 has a rounded corner contour, which also has a flow guiding effect and is not easy to generate noise or cause low efficiency.

The flow guiding cover 6 is detachably mounted on the baseplate 2 for easy removal, mounting, and maintenance. Specifically, the flow guiding cover 6 may be mounted on the baseplate 2 by using screws. As shown in FIG. 3, the flow guiding cover 6 may include a plurality of screw holes 61, and the screws are fixedly connected to the baseplate 2 through the screw holes 61. This connection manner is relatively reliable. In another embodiment, the flow guiding cover 6 may alternatively be connected to the baseplate 2 by using a snap fit. For example, the flow guiding cover 6 has a plurality of snap fits, the baseplate 2 has a plurality of bayonets, and the snap fits of the flow guiding cover 6 are inserted into the bayonets, to implement mounting of the flow guiding cover 6. This connecting structure does not need an auxiliary part, and the structure is relatively simple.

Figure 4:
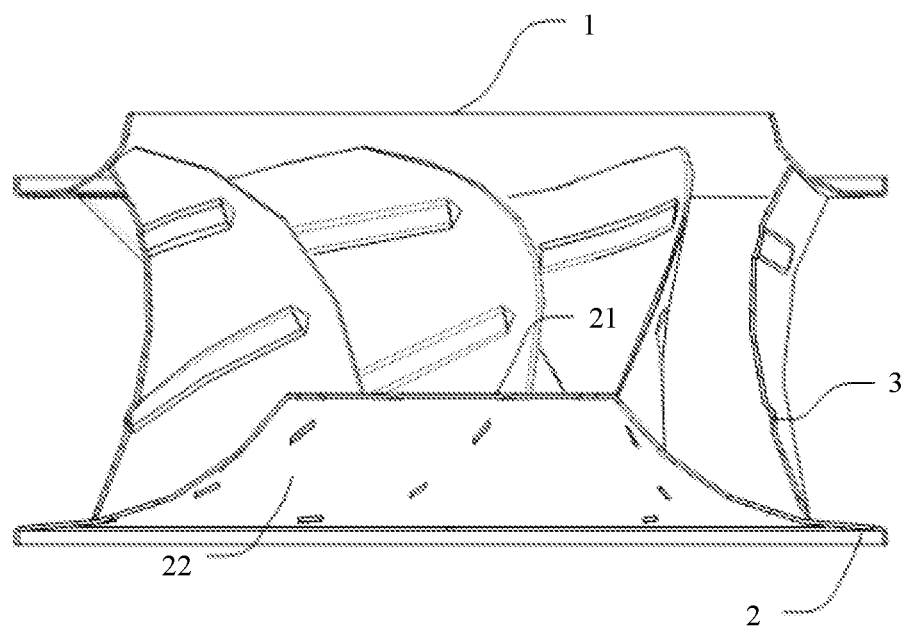
FIG. 4 is a cutaway diagram of a partial structure of a centrifugal fan according to an embodiment of this application.
Figure 5:
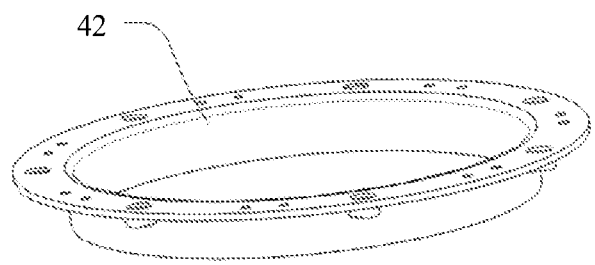
FIG. 5 is a schematic structural diagram of a mounting steel ring according to an embodiment of this application.

FIG. 4 is a cutaway diagram of a partial structure of a centrifugal fan according to an embodiment of this application. Specifically, the schematic cross-sectional structural diagram is a schematic diagram of a cross-sectional structure perpendicular to a baseplate and traversing an axis of a motor mounting hole. The schematic cross-sectional structural diagram shows a top plate, a baseplate, and blades of the centrifugal fan. Referring to FIG. 4, in an embodiment, the baseplate 2 has a mounting boss 22, and a motor mounting hole 21 is located on the mounting boss 22. The mounting boss 22 can increase strength of the motor mounting hole 21, thereby improving reliability and stability of mounting of a motor 4. Specifically, as shown in FIG. 2, the centrifugal fan further includes a mounting steel ring 42 configured to mount the motor 4. The mounting steel ring 42 is connected to a motor housing 41 through welding, or may be fixedly mounted on the mounting boss 22. A specific structure of the mounting steel ring 42 may be shown in FIG. 5. The mounting steel ring 42 may be connected to the baseplate 2 by using screws, for ease of mounting and removal.

When the baseplate 2 of the centrifugal fan has the mounting boss 22, the flow guiding cover 6 may be disposed on the mounting boss 22, and the mounting boss 22 may also have a flow guiding effect, to reduce a volume of the flow guiding cover 6.

To improve a flow guiding effect, the mounting boss 22 may also have a smooth transition surface, thereby improving the flow guiding effect of the mounting boss 22. Certainly, as shown in FIG. 2, an outer surface of the flow guiding cover 6 may be made to smoothly transition to an outer surface of the mounting platform, so that a relatively smooth transition surface is formed between the flow guiding cover 6 and the mounting boss, thereby improving the flow guiding effect.

Figure 6:
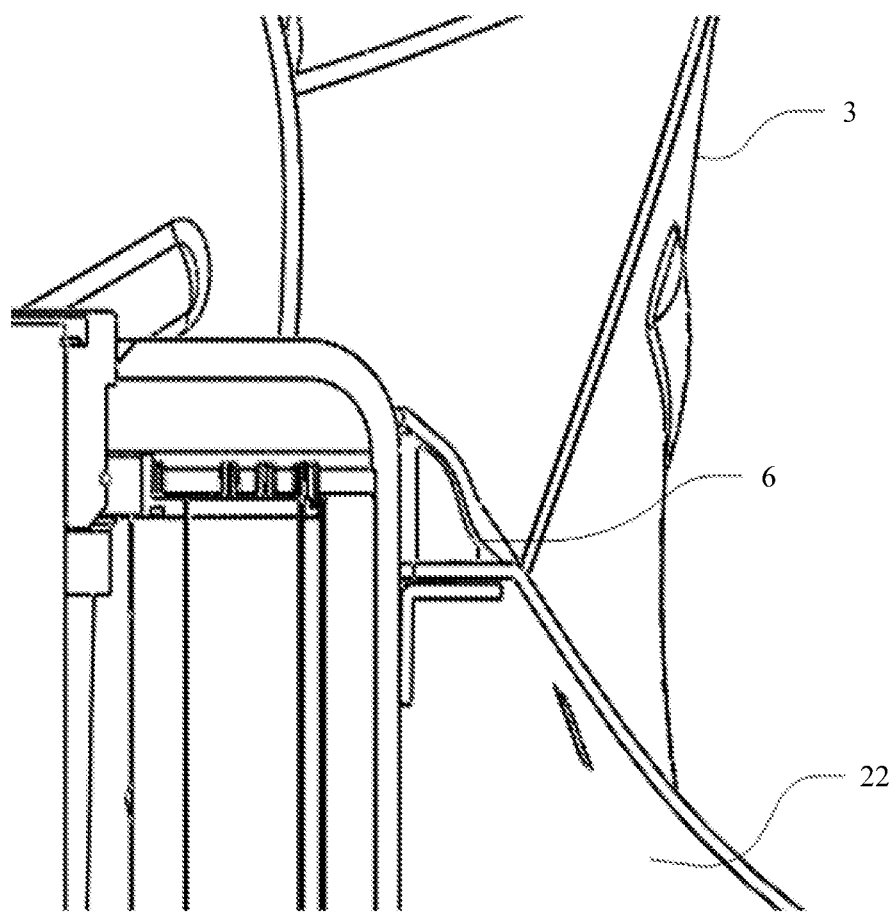
FIG. 6 is a partially enlarged cross-sectional diagram of a centrifugal fan according to an embodiment of this application.
Figure 7:
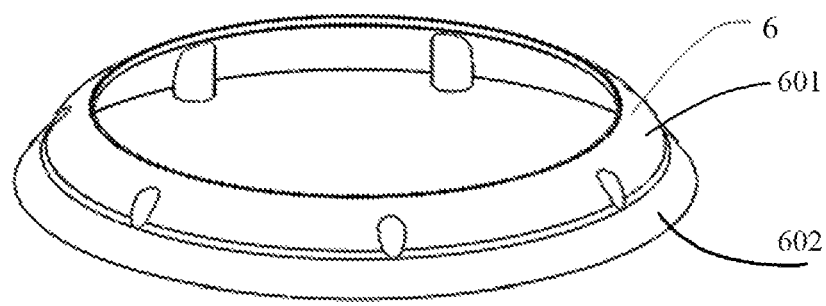
FIG. 7 is a schematic structural diagram of a flow guiding cover according to an embodiment of this application.

In a specific embodiment, a contour shape of the flow guiding cover 6 is not specifically limited. For example, a contour of the flow guiding cover 6 along one end close to the baseplate 2 to one end away from the baseplate 2 may be a straight line, an arc, a wavy line, or a sinusoidal waveform. As shown in FIG. 3, the outer surface of the flow guiding cover 6 is an arc surface. FIG. 6 is a partially enlarged cross-sectional diagram of a centrifugal fan according to an embodiment of this application. The schematic cross-sectional structural diagram is a partially enlarged diagram of a flow guiding cover part in a schematic diagram of a cross-sectional structure perpendicular to a baseplate and traversing a rotating shaft of a motor. Referring to FIG. 6, a contour line of the flow guiding cover 6 is a sinusoidal waveform, and the flow guiding cover 6 in this solution has a relatively good flow guiding effect and implements obvious noise reduction. FIG. 7 is a schematic structural diagram of a flow guiding cover 6 according to an embodiment of this application. As shown in FIG. 7, in an optional embodiment, a contour line of the flow guiding cover 6 is a wavy line.

In a specific embodiment, the flow guiding cover 6 may include at least two sub flow guiding covers 601 and 602. The at least two sub flow guiding covers 601 and 602 are sequentially stacked along a direction away from the baseplate 2, and a contour of the flow guiding cover 6 formed by the stacked sub flow guiding covers has a flow guiding effect. In this solution, a plurality of sub flow guiding covers with relatively small volumes may be prepared, to improve strength of the flow guiding cover 6 and facilitate manufacturing and transportation.

In the technical solution of this application, when the flow guiding cover 6 is mounted inside the centrifugal fan, the flow guiding cover 6 should be located between the blades 3 and the motor 4 and away from all blades 3. Specifically, a maximum outer diameter of the flow guiding cover 6 should be equal to a minimum inner diameter of the blade 3 on the wind rotor baseplate 2, and a minimum inner diameter of the flow guiding cover 6 should be equal to a diameter of a main body of the motor housing 41. This design ensures integrity of the blade 3 and the top plate 1, helping ensure wind rotor efficiency.

Figure 8:
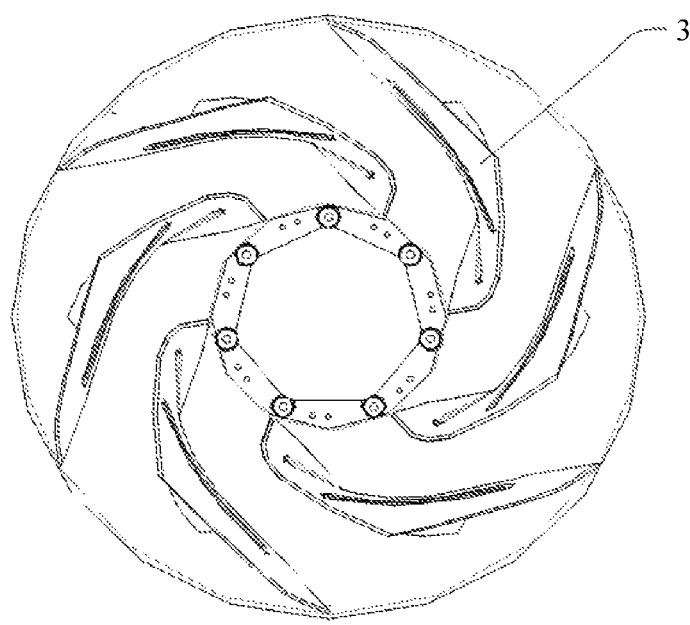
FIG. 8 is a schematic cross-sectional structural diagram of a centrifugal fan according to an embodiment of this application.
Figure 9:
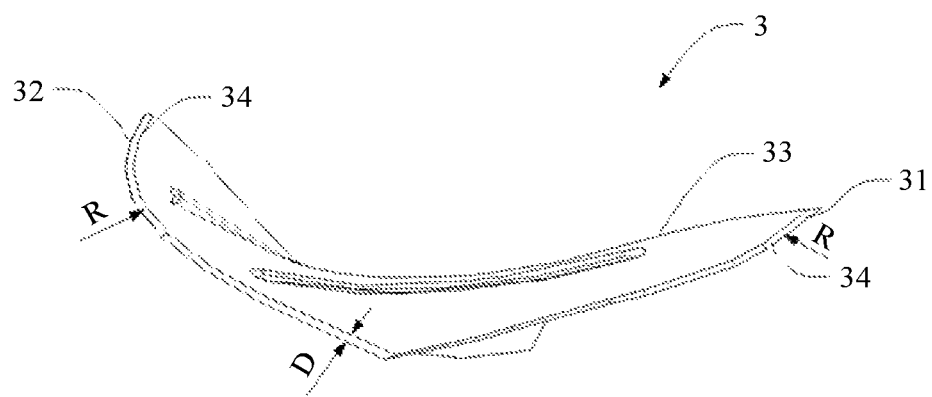
FIG. 9 is a schematic structural diagram of a blade according to an embodiment of this application.

FIG. 8 is a schematic cross-sectional structural diagram of a centrifugal fan according to an embodiment of this application. Specifically, the schematic cross-sectional structural diagram is a schematic diagram of a cross-sectional structure parallel to a baseplate and traversing a blade. FIG. 9 is a schematic structural diagram of a blade according to an embodiment of this application. As shown in FIG. 8 and FIG. 9, the blade 3 has a plurality of edges, including an air inlet edge 31 on an air inlet side and an air outlet edge 32 on an air outlet side. The blade 3 has a concave surface and a convex surface. The concave surface of the blade 3 is a suction side 33, and the convex surface is a pressure surface. In the technical solution of this application, the air inlet edge 31 and the air outlet edge 32 of the blade 3 have one-sided rounded corners facing the suction side 33. In other words, the air inlet edge 31 and the air outlet edge 32 do not have rounded corners on the pressure surface. In that conventional technology, the blades 3 usually have double-sided chamfers or double-sided rounded corners. Compared with the conventional technology, in the technical solution of this application, the one-sided rounded corner 34 is made on the edge of the blade 3, so that a manufacturing process can be simplified, and airflow running efficiency can be improved.

Further referring to FIG. 9, when the one-sided rounded corner 34 is specifically prepared, a radius R1 of the one-sided rounded corner 34 and a thickness D of the blade 3 may satisfy $R=\alpha D$, and $0.5 \leq \alpha \leq 1.5$. This solution helps reduce wind resistance of the blade 3 and improve efficiency of the centrifugal fan. Specifically, when the radius R of the one-sided rounded corner 34 is equal to the thickness D of the blade 3, the wind resistance of the blade 3 is lowest, and the efficiency of the centrifugal fan is highest.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A centrifugal fan comprising:
   a top plate;
   a baseplate with a motor mounting hole;
   a plurality of blades disposed between the top plate and the baseplate, wherein the plurality of blades are separately fastened to the top plate and the baseplate, and the plurality of blades are disposed around the motor mounting hole;

a motor with a motor housing, wherein the motor housing is mounted on the motor mounting hole and is fixedly connected to the baseplate, and the motor housing at least partially extends between the baseplate and the top plate;

a flow guiding cover detachably mounted on the baseplate, wherein the flow guiding cover is sheathed on an outer peripheral side of the motor housing, and the flow guiding cover comprises at least two stacked sub flow guiding covers which are sequentially stacked along a direction away from the baseplate; and wherein a highest point of the flow guiding cover is substantially flush with a lowest point of an edge of a rounded corner at a top of the motor housing.

2. The centrifugal fan according to claim 1, wherein one end of the flow guiding cover close to the baseplate forms a smooth transition to the baseplate.

3. The centrifugal fan according to claim 1, wherein one end of the flow guiding cover away from the baseplate forms a smooth transition to the outer peripheral side of the motor housing.

4. The centrifugal fan according to claim 1, wherein a contour line of an outer surface of the flow guiding cover along an end close to the baseplate to an end away from the baseplate is a wavy line or a sinusoidal waveform.

5. The centrifugal fan according to claim 1, wherein the baseplate has a mounting boss, the motor mounting hole is located on the mounting boss, and the flow guiding cover is disposed on the mounting boss.

6. The centrifugal fan according to claim 1, wherein the baseplate is a metal baseplate, the top plate is a metal top plate, the blades are metal blades, and the flow guiding cover is a plastic flow guiding cover.

7. The centrifugal fan according to claim 1, wherein air inlet edges and air outlet edges of the blades each have a one-sided rounded corner facing a suction surface.

8. The centrifugal fan according to claim 7, wherein a radius R1 of the one-sided rounded corner and a thickness D of the blade satisfy $R1=\alpha D$, and $0.5 \leq \alpha \leq 1.5$.

9. An air conditioning apparatus comprising: a centrifugal fan, wherein the centrifugal fan comprises:
a top plate;
a baseplate with a motor mounting hole;
a plurality of blades disposed between the top plate and the baseplate, wherein the plurality of blades are separately fastened to the top plate and the baseplate, and the plurality of blades are disposed around the motor mounting hole;

a motor with a motor housing, wherein the motor housing is mounted on the motor mounting hole and is fixedly connected to the baseplate, and the motor housing at least partially extends between the baseplate and the top plate;

a flow guiding cover detachably mounted on the baseplate, wherein the flow guiding cover is sheathed on an outer peripheral side of the motor housing, and the flow guiding cover comprises at least two stacked sub flow guiding covers which are sequentially stacked along a direction away from the baseplate; and wherein a highest point of the flow guiding cover is substantially flush with a lowest point of an edge of a rounded corner at a top of the motor housing.

10. The air conditioning apparatus according to claim 9, wherein one end of the flow guiding cover away from the baseplate forms a smooth transition to the outer peripheral side of the motor housing.

11. The air conditioning apparatus according to claim 9, wherein one end of the flow guiding cover close to the baseplate forms a smooth transition to the baseplate.

12. The air conditioning apparatus according to claim 9, wherein the baseplate has a mounting boss, the motor mounting hole is located on the mounting boss, and the flow guiding cover is disposed on the mounting boss.

13. The air conditioning apparatus according to claim 9, wherein the baseplate is a metal baseplate, the top plate is a metal top plate, the blades are metal blades, and the flow guiding cover is a plastic flow guiding cover.

14. The air conditioning apparatus according to claim 9, wherein air inlet edges and air outlet edges of the blades each have a one-sided rounded corner facing a suction surface.

15. The air conditioning apparatus according to claim 9, wherein a radius R1 of a one-sided rounded corner and a thickness D of the blade satisfy $R1=\alpha D$, and $0.5 \leq \alpha \leq 1.5$.

* * * * *